United States Patent [19]

Khoshdel et al.

[11] Patent Number: 5,159,041
[45] Date of Patent: Oct. 27, 1992

[54] POLYMERS AND DETERGENT COMPOSITIONS CONTAINING THEM

[75] Inventors: Ezat Khoshdel, Neston; Cornelis G. van Kralingen, Chester, both of England

[73] Assignee: Lever Brothers Company, New York, N.Y.

[21] Appl. No.: 626,921

[22] Filed: Dec. 13, 1990

[30] Foreign Application Priority Data

Dec. 14, 1989 [GB] United Kingdom ............... 8928320

[51] Int. Cl.$^5$ .................. C08F 22/02; C08F 20/04
[52] U.S. Cl. ............................. 526/318.2; 526/318.3
[58] Field of Search ............... 526/318.1, 318.2, 318.3

[56] References Cited

U.S. PATENT DOCUMENTS

| 3,066,165 | 11/1962 | Rosenthal et al. | |
| 3,288,883 | 11/1966 | Tremin et al. | |
| 3,306,883 | 2/1967 | Ravve et al. | 525/384 |
| 3,308,067 | 4/1963 | Diehl | 252/550 |
| 3,743,669 | 7/1973 | Hillman | |
| 3,890,291 | 6/1975 | Vogt et al. | 526/318.3 |
| 3,920,570 | 11/1975 | Mulders | 252/174.24 |
| 4,079,016 | 3/1978 | Brahm et al. | 252/99 |
| 4,129,423 | 12/1978 | Rubin | |
| 4,916,178 | 4/1990 | Amati et al. | 54/401 |

FOREIGN PATENT DOCUMENTS

| 450758 | 2/1972 | Australia. |
| 832067 | 1/1970 | Canada. |
| 124913B | 11/1984 | European Pat. Off.. |
| 940766 | 11/1963 | United Kingdom. |
| 1054755 | 1/1967 | United Kingdom. |
| 1328749 | 8/1973 | United Kingdom. |
| 1460893 | 1/1977 | United Kingdom. |
| 1596756 | 8/1981 | United Kingdom. |

OTHER PUBLICATIONS

GB Patent Office Search Report EP 184,731A-Abstract.
Mathias et al., Macromolecules 20 2326 (1987) EP 25,551B-Abstract.

Primary Examiner—Joseph L. Schofer
Assistant Examiner—Wu C. Cheng
Attorney, Agent, or Firm—James J. Farrell

[57] ABSTRACT

Certain polymeric polycarboxylic acids and salts containing hydroxyl or hydroxymethyl groups in close proximity to carboxyl groups, especially poly(2-hydroxymethylacrylic) acid and its salts, are effective sequestrants of divalent and polyvalent metal ions and are useful as builders in detergent compositions.

12 Claims, No Drawings

POLYMERS AND DETERGENT COMPOSITIONS CONTAINING THEM

TECHNICAL FIELD

The present invention relates to polymeric polycarboxylic acids and salts, and their use as metal ion sequestrants and as builders in detergent compositions.

BACKGROUND AND PRIOR ART

Polycarboxylate polymers are well-known ingredients of detergent compositions and provide various benefits. They are used, for example, as antiredeposition and antiincrustation agents, and for supplementary detergency building, especially in conjunction with water-insoluble aluminosilicate builders.

Acrylic and maleic polymers have been especially widely used. For example, GB 1 596 756 (Procter & Gamble) is concerned with maleic polymers, especially methyl vinyl ether/maleic anhydride copolymers, and their use as auxiliary detergent builders in phosphate-built compositions. GB 1 460 893 (Unilever) discloses the use of polyacrylates as antiincrustation agents in detergent compositions containing ortho- and pyrophosphate builders. EP 25 551B (BASF) discloses the use of acrylic/maleic copolymers as antiincrustation agents. EP 124 913B (procter & Gamble) discloses detergent compositions containing a combination of polyacrylate and acrylic/maleic copolymer.

Although various polymers have been disclosed in the literature, only polyacrylates and acrylate/maleate copolymers have found widespread use in commercial detergent products.

The present invention is based on the observation that certain carbon backbone polycarboxylate polymers having hydroxyl and or hydroxymethyl groups in close proximity to the carboxyl groups exhibit efficient improved detergency building (calcium binding).

GB 1 328 749 (Solvay) discloses the use as metal ion sequestrants of water-soluble salts of poly (alpha-hydroxyacrylic acid) of the formula I :

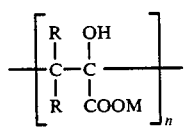

wherein the R groups are hydrogen atoms or $C_1$-$C_3$ alkyl groups, and M is an alkali metal or ammonium cation. The salts may be used as replacements for sodium tripolyphosphate as builders in detergent compositions.

2-hydroxymethylacrylate monomer of the formula II:

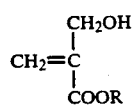

wherein R is a lower alkyl group, is disclosed in EP 184 731A (BASF), and the polymerisation of methyl ester derivatives has been reported by L J Mathias, S. J. Kusefoglu and A. O. Kress, Macromolecules 1987 20 2326. Polymers in free acid or salt form, that is to say, containing units of the formula III:

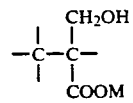

wherein M represents a hydrogen atom or a solubilising cation, are not disclosed.

U.S. Pat. No. 3,743,669 (Hillman & Co/Celanese Corp) discloses the preparation of 2-(1-hydroxymethyl)acrylic esters and their polymerisation to produce adhesives. U.S. Pat. No. 3,066,165 (Rosenthal et al/Koppers Co Inc) discloses the preparation of alkyl α-(hydroxymethyl) acrylates, and their use as copolymers in latices.

DEFINITION OF THE INVENTION

In its first aspect, the present invention provides a polymeric polycarboxylic acid or salt comprising units of the formula IV:

and/or units of the formula V:

and/or units of the formula VI:

and/or units of the formula VII:

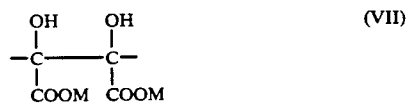

and/or units of the formula VIII:

and/or units of the formula IX:

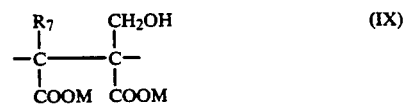

wherein each of the R groups, which may be the same or different, represents a hydrogen atom, a methyl group or an ethyl group, preferably a hydrogen atom; and M represents a hydrogen atom or a solubilising cation, preferably an alkali metal or ammonium cation, more preferably a sodium ion; with the proviso that the polymer does not consist solely of units of the formula IV, that is to say, of units of o-hydroxyacrylic acid or its $C_{1-2}$ homologues.

In its second aspect, the present invention provides the use of the polymers defined above to bind divalent and polyvalent metals, especially calcium; more especially, their use as builders in detergent compositions.

In its third aspect, the present invention provides a detergent composition comprising at least one detergent-active compound, suitably in an amount of from 0.5 to 60 wt%, and at least one detergency builder, suitably in an amount of from 15 to 80 wt%, the detergency builder consisting wholly or partially of a polymer as defined above.

DETAILED DESCRIPTION OF THE INVENTION

The polymers

The polymers of the invention are characterised by a main chain or backbone of carbon atoms and a plurality of carboxyl groups bonded to the main chain, wherein there are also present hydroxy and/or hydroxymethyl groups separated from at least some of the carboxyl groups by not more than one carbon atom; that is to say, hydroxy or hydroxymethyl groups are present in the α-position to at least some of the carboxyl groups.

The polymers of the invention may also contain other monomer units. Preferred are units containing further carboxyl groups, which contribute to calcium binding.

Especially preferred units are those of any of the following formulae X to XV:

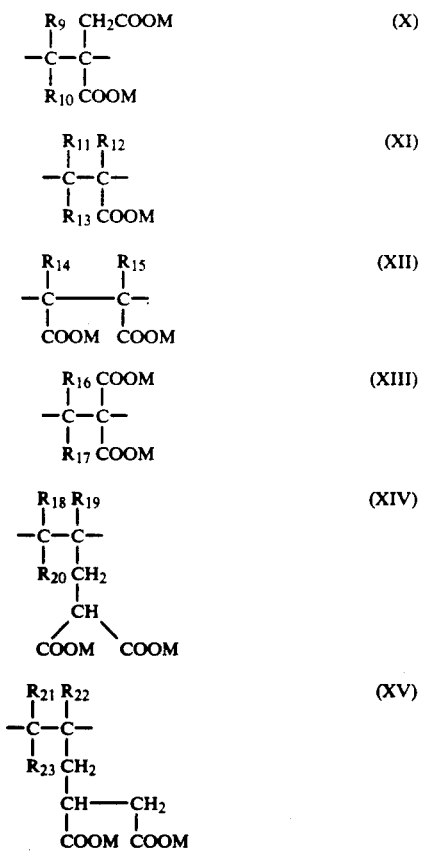

wherein the R groups, as previously, are hydrogen atoms, methyl groups or ethyl groups, in any combination, but preferably hydrogen atoms; and M represents a hydrogen atom or a solubilising cation, preferably a sodium ion.

Molecular weights

The molecular weights of the polymers may vary over a wide range. Preferably the number-average molecular weight is at least 1000, more preferably from 1000 to 100,000, and most preferably from 3,000 to 40,000. The weight-average molecular weight is preferably at least 1000, more preferably from 1000 to 1,000,000, and most preferably from 5,000 to 800,000.

Preferred polymers

A first preferred class of polymers according to the invention comprise units of the formula VIII derived from 2-hydroxymethylacrylic acid, or a salt thereof. Especially preferred polymers within this class include the following:

poly(2-hydroxymethylacrylic) acid and salts thereof (units of the formula VIII only);

copolymers of 2-hydroxymethylacrylic acid and acrylic acid, and salts thereof (units of the formula VIII and units of the formula XI);

copolymers of 2-hydroxymethylacrylic acid and itaconic acid, and salts thereof (units of the formula VIII and units of the formula X);

copolymers of 2-hydroxymethylacrylic acid and 2-hydroxyacrylic acid, and salts thereof (units of the formula VIII and units of the formula IV).

A second preferred class of polymers according to the invention comprise copolymers of α-hydroxyacrylic acid, and salts thereof, comprising units of the formula IV and units of at least one of the formulae V to XV. These include:

copolymers of α-hydroxyacrylic acid and hydroxymaleic acid, and salts thereof (units of the formula IV and units of the formula V);

copolymers of α-hydroxyacrylic acid and dihydroxymaleic acid, and salts thereof (units of the formula IV and units of the formula VII);

copolymers of α-hydroxyacrylic acid and allyl malonic acid, and salts thereof (units of the formula IV and units of the formula XIV).

Other preferred polymers in accordance with the invention include copolymers of dihydroxymaleic acid and acrylic acid, and salts thereof (units of the formula VII and the units of the formula XI).

Preparation of the polymers

The polymers of the invention may be prepared by conventional radical bulk or solution (aqueous or organic) polymerisation techniques.

To introduce hydroxyl groups into the main chain, halogenated precursors such as α-chloroacrylic acid, bromo- or chloromaleic anhydride and dichloromaleic anhydride, or esterified precursors such as vinyl acetate, may be used. After appropriate homo- or copolymerisation, the resulting halogenated or esterified materials may be hydrolysed to give the hydroxylated polymers.

Polymers and copolymers of 2-hydroxymethylacrylic acid may be prepared by polymerising or copolymerising a lower alkyl 2-hydroxymethylacrylate ester, then hydrolysing the resulting polymer. As mentioned previously, the ester monomer and its preparation are disclosed in EP 184 731A (BASF), and polymerisation of the methyl ester is described by L. J. Mathias, S. J.

Kusefoglu and A. O. Kress, Macromolecules 1987 20 2326.

An alternative method of introducing hydroxymethyl groups into the polymer chain is by means of allyl acetate: the acetate groups in the resulting polymer may be hydrolysed to give hydroxymethyl groups.

Polymerisations will generally be carried out in the presence of a radical initiator, for example, sodium or potassium persulphate, 2,2-azobis(amidinopropane) hydrochloride, dibenzoyl peroxide (Lucidol), cyclohexanone peroxide, di-tert-butyl peroxide, 2,2-azobis-isobutyronitrile (AIBN), cyclohexylsulphonyl peroxide (Percadox ACS), diisopropylperdicarbonate (Percadox JPP), and cumene hydroperoxide. Preferred initiators are sodium or potassium persulphate, and 2,2-azobis-(amidinopropane) hydrochloride. The initiator is preferably added gradually to the reaction mixture. The preferred polymerisation temperature range is between 40° and 120° C.

If higher molecular weight branched materials are desired, there may be included in the monomer mixture a small amount of a branching agent, for example, butanedioldiacrylate, divinyl benzene, glycoldivinyl ether, adipic acid divinyl ether, bisphenol A dimethacrylate, divinyl 2,4,8,10-tetraoxospiro [5.5]undecane, pentaerythritol triacrylate, acrylamidomethyl dextrin (DP6 3108 ex Allied Colloids), divinyl ether, or vinyl allyl ether.

Detergent compositions

The novel detergency builders of the present invention may be incorporated in detergent compositions of all physical types, for example, powders, liquids, gels, and solid bars. They may if desired be used in conjunction with other detergency builders.

The total amount of detergency builder in the compositions will suitably range from 15 to 80 wt%, and this may be constituted wholly or partially by the polymeric materials of the invention.

Inorganic builders that may be present include sodium carbonate, if desired in combination with a crystallisation seed for calcium carbonate, as disclosed in GB 1 437 950 (Unilever); crystalline and amorphous aluminosilicates, for example, zeolites as disclosed in GB 1 473 201 (Henkel), amorphous aluminosilicates as disclosed in GB 1 473 202 (Henkel) and mixed crystalline/amorphous aluminosilicates as disclosed in GB 1 470 250 (Henkel); and layered silicates as disclosed in EP 164 514B (Hoechst). Inorganic phosphate builders, for example, sodium orthophosphate, pyrophosphate and tripolyphosphate, may also be present, but the invention is of particular applicability to compositions containing reduced or zero levels of inorganic phosphate.

Organic builders that may be present include other polycarboxylate polymers such as polyacrylates, acrylic/maleic copolymers, and acrylic phosphinates; monomeric polycarboxylates such as citrates, gluconates, oxydisuccinates, tartrate monosuccinates and disuccinates, glycerol mono-, di- and trisuccinates, carboxymethyloxysuccinates, carboxymethyloxymalonates, dipicolinates, hydroxyethyliminodiacetates, nitrilotriacetates, ethylenediaminetetraacetates, alkyl-and alkenyl malonates and succinates, and sulphonated fatty acid salts. This list is not intended to be exhaustive.

Detergent compositions of the invention will also contain, as essential ingredients, one or more detergent-active compounds which may be chosen from soap and non-soap anionic, cationic, nonionic, amphoteric and zwitterionic detergent-active compounds, and mixtures thereof. Many suitable detergent-active compounds are available and are fully described in the literature, for example, in "Surface-Active Agents and Detergents", Volumes I and II, by Schwartz, Perry and Berch.

The preferred detergent-active compounds that can be used are soaps and synthetic non-soap anionic and nonionic compounds.

Anionic surfactants are well known to those skilled in the art. Examples include alkylbenzene sulphonates, particularly sodium linear alkylbenzene sulphonates having an alkyl chain length of $C_8$–$C_{15}$; primary and secondary alkyl sulphates, particularly sodium $C_{12}$–$C_{15}$ primary alcohol sulphates; alkyl ether sulphates; olefin sulphonates; alkane sulphonates; alkyl xylene sulphonates; dialkyl sulphosuccinates; and fatty acid ester sulphonates.

Nonionic surfactants that may be used include the primary and secondary alcohol ethoxylates, especially the $C_{12}$–$C_{15}$ primary and secondary alcohols ethoxylated with an average of from 3 to 20 moles of ethylene oxide per mole of alcohol; and alkylpolyglycosides.

The choice of surfactant, and the amount present, will depend on the intended use of the detergent composition. For example, for machine dishwashing a relatively low level of a low-foaming nonionic surfactant is generally preferred. In fabric washing compositions, different surfactant systems may be chosen, as is well known by the skilled detergent formulator, for handwashing products and for machine washing products.

The total amount of surfactant present will of course depend on the intended end use and may be as low as 0.5% by weight, for example in a machine dishwashing composition, or as high as 60% by weight, for example in a composition for washing fabrics by hand. For fabric washing compositions in general, an amount of from 5 to 40% by weight is generally appropriate.

Detergent compositions suitable for use in most automatic fabric washing machines generally contain anionic non-soap surfactant, or nonionic surfactant, or combinations of the two in any ratio, optionally together with soap.

Detergent compositions according to the invention may also suitably contain a bleach system. Machine dishwashing compositions may suitably contain a chlorine bleach, while fabric washing compositions may contain peroxy bleach compounds, for example, inorganic persalts or organic peroxyacids, which may be employed in conjunction with activators to improve bleaching action at low wash temperatures.

Preferred inorganic persalts for inclusion in fabric washing compositions are sodium perborate monohydrate and tetrahydrate, and sodium percarbonate, advantageously employed together with an activator. Bleach activators, also referred to as bleach precursors, have been widely disclosed in the art. Preferred examples include peracetic acid precursors, for example, tetraacetylethylene diamine, now in widespread commercial use in conjunction with sodium perborate; and perbenzoic acid precursors. The novel quaternary ammonium and phosphonium bleach activators disclosed in U.S. Pat. No. 4,751,015 and U.S. Pat. No. 4,818,426 (Lever Brothers Company) are also of great interest.

Other materials that may be present in detergent compositions of the invention include sodium silicate, fluorescers, antiredeposition agents, inorganic salts such as sodium sulphate, enzymes, lather control agents or lather boosters as appropriate, pigments, and perfumes. This list is not intended to be exhaustive.

Detergent compositions of the invention may be prepared by any suitable method. Detergent powders are suitably prepared by spray-drying a slurry of compatible heat-insensitive components, and then spraying on or postdosing those ingredients unsuitable for processing via the slurry. The skilled detergent formulator will have no difficulty in deciding which components should be included in the slurry and which should be postdosed or sprayed on. The polymeric builder material of the invention may generally be included in the slurry if desired, although other methods of incorporation may of course be used if desired.

EXAMPLES

The invention will now be further illustrated by the following non-limiting Examples.

Characterisation of the polymers

The polymers were characterised by infrared spectrometry and in some cases by nuclear magnetic resonance spectroscopy.

The infrared instrumentation used included the Nicolet (Trade Mark) 1705X Fourier Transform infrared spectrometer with MCT detector using the Nicolet 1280 processor, and the Nicolet SDXC Fourier Transform infrared spectrometer with DGS detector using the Nicolet 62 processor.

$^{13}$C NMR spectra were run on a Brucker (Trade Mark) WM 360 MHz Fourier Transform spectrometer.

Number-average and weight-average molecular weights of polymeric materials were determined by gel permeation chromatography. This was carried out using a Hewlett Packard (Trade Mark) HP 1090 liquid chromatograph fitted with a 30 cm×7.5 cm TSK gel linear GMPW column. Organic-solvent-soluble polymers were measured against polystyrene standards, and water-soluble polymers against polyethylene glycol.

Calcium binding

The calcium binding properties of the polymers were measured by titration of the samples with a calcium chloride solution using a calcium-ion-selective electrode of the type Radiometer (Trade Mark) F2112Ca. The calcium binding constant $pK_{Cap2+}$ was calculated by the method of C Tanford in Chapter 8, Multiple Equilibria, Physical Chemistry of Macromolecules, John Wiley, New York, 1961.

Values of $pK_{Ca2+}$ of 4.0 or above represent materials likely to be useful as detergency builders, either alone or in conjunction with other builder materials.

EXAMPLE 1 poly (2-hydroxymethylacrylate)

This example describes a polymer of the formula XVI shown below, in which n represents an integer, consisting of units within the formula VIII as defined previously.

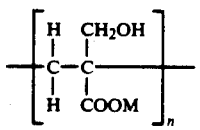
(XVI)

The methyl ester of 2-hydroxymethylacrylic acid was first prepared as follows. Methyl acrylate (25.8 g, 0.3 mole), 37% aqueous formaldehyde (22.5 g), 1,4-diazabicyclo[2-2.2]octane (DABCO) (2 g) and methanol (25 ml) were stirred in a flask equipped with a magnetic stirrer for 48 hours at room temperature, while the pH was maintained at about 9. The turbid mixture was acidified to pH 5.5 with concentrated hydrochloric acid. Organic material was extracted with ether (3×100 ml), the combined ether extracts were washed with saturated brine (1×100 ml, 2×50 ml), then dried over magnesium sulphate and filtered, and the ether removed by rotary evaporation. The resulting clear oil was purified by vacuum distillation without appreciable loss. The product, which was shown by gas chromatography to be of >98% purity, was identified by infrared spectrometry as being identical to that described in the literature.

The polymer was prepared as follows. The monomer (10 g) was dissolved in deionised water (180 ml) in a 500 ml reaction flask fitted with a mechanical stirrer, condenser, oxygen-free nitrogen sparge tube, and gas outlet. The solution was heated under nitrogen in a waterbath held at 60° C. Sodium persulphate initiator (0.2 g) dissolved in degassed water (10 ml) was added to the stirred solution. After approximately 0.5 hour a white precipitate of polymer appeared. A second addition of initiator (0.1 g in 10 ml water) was made after several hours and the polymerisation continued to give a total reaction time of 24 hours. After cooling, the polymer was filtered off, washed with water, then with methanol and hexane to de-swell it; finally it was vacuum-dried at 60° C.

This product was the polymeric ester. It was hydrolysed to the sodium salt by stirring at 60° C. with a 10% aqueous sodium hydroxide solution. Initially, a less than stoichiometric amount of base was present; further incremental additions of base were made until a stable pH of 8–9 was achieved. The solution was diluted and centrifuged to remove a small amount of gel, then freeze dried to isolate the salt. The yield was 5.2 g.

The infrared spectrum (KBr wafer) showed characteristic strong absorptions at 3500 cm$^{-1}$ (H-bonded OH str), 1580 and 1400 cm$^{-1}$ (—COO str)

Molecular weight and calcium binding results were as follows:

| Example | Molecular weight | | | $pK_{Ca2+}$ |
|---|---|---|---|---|
| | $M_n$ | $M_w$ | D | |
| 1 | 4 800 | 18 400 | 3.80 | 4.5 |

EXAMPLE 2 poly(2-hydroxymethylacrylate)

A second polymer of the formula XVI given in Example 1 was prepared by a similar method. Molecular weight and calcium binding results were as follows:

| Example | Molecular weight | | | $pK_{Ca2+}$ |
|---|---|---|---|---|
| | $M_n$ | $M_w$ | D | |
| | 11 200 | 732 000 | 65.36 | 6.0 |

EXAMPLE 3 poly(2-hydroxymethylacrylate)

A third polymer of the formula XVI given in Example 1 was prepared, by a different procedure.

The monomer (10 g), azoisobutyronitrile (200 mg) and dioxan (10 ml) were charged to an evacuable sealed tube reactor. On evacuation, the tube was placed in a thermostatted bath at 60° C. for 72 hours. The solid mass obtained was dissolved in the minimum amount of acetone and the polymer purified by triple precipitation into petroleum ether. The white solid obtained (the polymeric ester) was then hydrolysed with aqueous sodium hydroxide solution to form the corresponding sodium salt, and the resulting solution was freeze dried. The yield was 6.70 g.

The infrared spectrum (KBr wafer) showed characteristic strong absorptions at 3500 cm$^{-1}$ (H-bonded OH str), 1580 and 1400 cm$^{-1}$ (—COO str).

Molecular Weight and calcium binding results were as follows:

| Example | Molecular weight | | D | pK$_{Ca2+}$ |
| --- | --- | --- | --- | --- |
|  | M$_n$ | M$_w$ | | |
|  | 10 880 | 41 300 | 3.90 | 5.1 |

EXAMPLE 4

2-hydroxymethylacrylate/acrylate copolymer

A polymer was prepared by copolymerisation of 2-hydroxymethylacrylate methyl ester prepared as described in Example 1 (2 g) and acrylic acid (6.5 g). The polymerisation was carried out by the procedure described in Example 1. The yield was 8.0 g.

The polymer had the formula XVII shown below, wherein n and m are integers, and consisted of units within the formulae VIII and XI as defined previously.

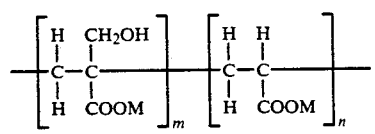
(XVII)

Molecular weights and calcium binding results were as follows:

| Example | Molecular weight | | D | pK$_{Ca2+}$ |
| --- | --- | --- | --- | --- |
|  | M$_n$ | M$_w$ | | |
| 4 | 33 900 | 330 100 | 9.73 | 4.2 |

EXAMPLE 5

2-hydroxymethylacrylate/itaconate copolymer

A polymer was prepared by copolymerisation of α-hydroxymethylacrylic acid methyl ester, prepared as described in Example 1, and itaconic acid. The polymer had the formula XVIII shown below, wherein n and m are integers, and consisted of units within the formulae VIII and X as defined previously.

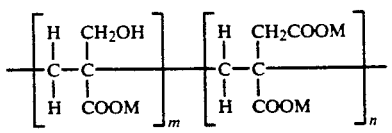
(XVIII)

2-hydroxymethylacrylic acid methyl ester (7.0 g, 60 mmole), itaconic acid (7.0 g), 54 mmole) and water (90 ml) were placed in a flange flask fitted with a condenser, electric stirrer and nitrogen inlet. The reaction mixture was degassed with nitrogen for 30 minutes. Potassium persulphate solution (1.5 g, 6 mmole, in 10 ml water) was added, and the reaction mixture was heated to 60° C. and maintained at that temperature for 24 hours under nitrogen. The resulting polymer (ester) was coagulated and washed by pouring the reaction mixture into excess methanol. It was then hydrolysed to the sodium salt by heating with sodium hydroxide solution (13.68 g NaOH in 40 ml water). Once hydrolysis was complete, the polymer was coagulated and washed with methanol. After two more precipitations from water into methanol, the polymer was freeze dried. The yield was 8.7 g.

Infrared data (KBr wafer) were as follows:

| Short chain polycarboxylate | (C=O str) | 1600 cm$^{-1}$ |
| --- | --- | --- |
|  | (OH str) | 3500 cm$^{-1}$ |
|  | (C—O str) | 1100 cm$^{-1}$ |

Molecular weights and calcium binding results were as follows:

| Example | Molecular weight | | D | pK$_{Ca2+}$ |
| --- | --- | --- | --- | --- |
|  | M$_n$ | M$_w$ | | |
| 5 | 3 200 | 5 950 | 1.86 | 5.5 |

EXAMPLE 6

2-hydroxymethylacrylate/α-hydroxyacrylate copolymer

This example describes the preparation of a polymer of the formula XIX shown below, wherein n and m are integers, consisting of units within the formulae IV and VIII as defined previously.

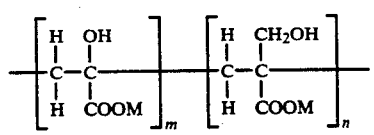
(XIX)

The polymer was prepared by copolymerisation of 2-hydroxymethylacrylate methyl ester prepared as described in Example 1 (3 g) and 2-chloroacrylic acid (8.3 g). The polymerisation was carried out by the procedure described in Example 1; the alkaline hydrolysis step also caused replacement of the chlorine atoms introduced by the 2-chloroacrylic acid to hydroxyl groups. The yield was 11.8 g. Molecular weights and calcium binding results were as follows:

| Example | Molecular weight | | D | pK$_{Ca^{2+}}$ |
|---|---|---|---|---|
| | M$_n$ | M$_w$ | | |
| 8 | 16 800 | 92 950 | 5.53 | 5.3 |

EXAMPLE 7

α-hydroxyacrylate/hydroxymaleate copolymer

A polymer was prepared by copolymerisation of 2-chloroacrylic acid and bromoomaleic anhydride, followed by alkaline hydrolysis. The polymer had the formula XX shown below, wherein n and m are integers, and consisted of units within the formulae IV and V as defined previously.

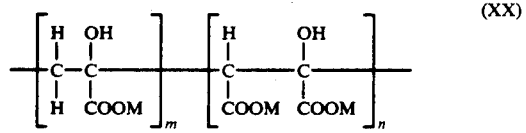
(XX)

Bromomaleic anhydride (18.8 g, 0.1 mole) and 2-chloroacrylic acid (10.6 g, 0.1 mole) were charged into a sealed tube reactor together with toluene (10 ml) and azoisobutyronitrile (300 mg). The tube was then sealed under vacuum and placed in a water bath at 60° C. for 24 hours. A brown solid was obtained. Water (300 ml) was added and the reaction mixture was then heated under reflux for several hours until all the halogens were displaced. The mixture was then neutralised with sodium hydroxide (12 g, 0.3 mole), and the sodium salt was precipitated into a large excess of ethanol and filtered. The yield of solid polymer was 10 g.

Infrared data (KBr wafer) were as follows:

| Short chain carboxylate (C=O str) | 1600 cm$^{-1}$ |
|---|---|
| Secondary alcohol (OH str) | 1120 cm$^{-1}$ |

Molecular weights and calcium binding results were as follows:

| Example | Molecular weight | | D | pK$_{Ca^{2+}}$ |
|---|---|---|---|---|
| | M$_n$ | M$_w$ | | |
| 6 | 7 300 | 55 600 | 7.62 | 7.1 |

EXAMPLE 8

α-hydroxyacrylate/dihydroxymaleate copolymer

A polymer was prepared by copolymerisation of 2-chloroacrylic acid and dichloromaleic anhydride, followed by alkaline hydrolysis. The polymer had the formula XXI shown below, wherein n and m are integers, and consisted of units within the formulae IV and VII as defined previously.

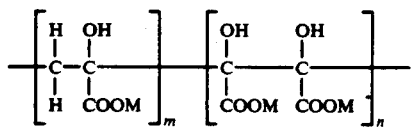
(XXI)

Dichloromaleic anhydride (16.7 g, 0.7 mole), 2-chloroacrylic acid (10.6 g, 0.1 mole) and tetrahydrofuran (50 ml) were placed in a flange flask and degassed with nitrogen for 30 minutes. Azoisobutyronitrile (300 mg, 1.8 mmole) was added and the reaction mixture was stirred at 24 hours at 65° C. under a nitrogen atmosphere. The polymer was isolated by precipitation into diethyl ether. After two more such precipitations, the product was dried in a vacuum oven at 35° C. The yield was 8.31 g.

Infrared data (KBr wafer) were as follows:

| Short chain carboxylate | (C=O str) | 1600 cm$^{-1}$ |
|---|---|---|
| Hydroxyl group | (OH str) | 3500 cm$^{-1}$ |
| | (C—O str) | 1100 cm$^{-1}$ |

Molecular weights and calcium binding results were as follows:

| Example | Molecular weight | | D | pK$_{Ca^{2+}}$ |
|---|---|---|---|---|
| | M$_n$ | M$_w$ | | |
| 7 | 3 400 | 19 100 | 5.62 | 4.5 |

EXAMPLE 9 dihydroxymaleate/acrylate copolymer

A polymer was prepared by copolymerisation of dichloromaleic anhydride and acrylic acid, followed by alkaline hydrolysis. The polymer had the formula XXII shown below, wherein n and m are integers, and consisted of units within the formulae VII and XI as defined previously.

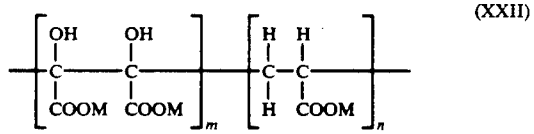
(XXII)

Dichloromaleic anhydride (16.7 g, 0.1mole), acrylic acid (7.2 g, 0.1 mole) and methyl ethyl ketone (50 ml) were placed in a flange flask and degassed with nitrogen for 30 minutes. Azoisobutyronitrile (250 mg, 1.5 mmole) was added and the reaction mixture was stirred for 24 hours at 65° C. under a nitrogen atmosphere. The product which was formed as a white solid mass was washed with methyl ethyl ketone, purified by triple precipitation as described in earlier Examples, and dried in a vacuum oven at 35° C. It was then hydrolysed with sodium hydroxide to yield 8.9 g of the sodium salt.

Infrared data (KBr wafer) were as follows:

| Short chain carboxylate | (C=O str) | 1600 cm$^{-1}$ |
|---|---|---|
| Hydroxyl group | (OH str) | 3500 cm$^{-1}$ |

Molecular weights and calcium binding results were as follows:

| Example | Molecular weight | | D | pK$_{Ca^{2+}}$ |
|---|---|---|---|---|
| | M$_n$ | M$_w$ | | |
| 9 | 32 500 | 126 600 | 3.90 | 4.6 |

EXAMPLE 10

α-hydroxyacrylate/allyl malonate copolymer

A polymer was prepared by copolymerisation of 2-chloroacrylic acid and allyl malonic acid dimethyl ester, followed by alkaline hydrolysis. The polymer had the formula XXIII shown below, wherein n and m are integers, and consisted of units within the formulae IV and XIV as defined previously.

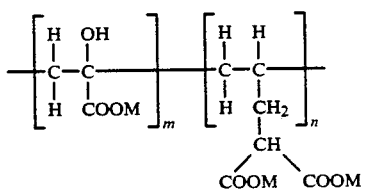
(XXIII)

2-chloroacrylic acid (15.88 g, 14.9 mmole), dimethyl allylmalonate (6.8 g, 39 mmole) and water (180 ml) were degassed for 30 minutes in a flange flask fitted with a condenser, electric stirrer and nitrogen inlet. Sodium persulphate solution (1 g in 10 ml water) was added, and the reaction mixture was heated at 65° C. for 24 hours with stirring under a nitrogen atmosphere. The polymer was isolated by triple precipitation into methanol, and converted into the sodium salt by heating with sodium hydroxide solution as described in earlier Examples. The yield was 6.4 g.

Infrared data (KBr wafer) were as follows:

| Short chain carboxylate | (C=O str) | 1600 cm$^{-1}$ |
|---|---|---|
| Hydroxyl group | (OH str) | 3500 cm$^{-1}$ |

Molecular weights and calcium binding results were as follows:

| Example | Molecular weight | | | pK$_{Ca^{2+}}$ |
|---|---|---|---|---|
| | $M_n$ | $M_w$ | D | |
| 10 | 3250 | 9000 | 2.77 | 5.5 |

We claim:

1. A polymeric polycarboxylic acid or salt comprising

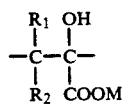
(IV)

units of the formula V:

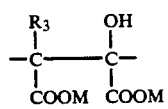
(V)

and/or units of the formula VI:

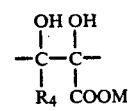
(VI)

and/or units of the formula VII:

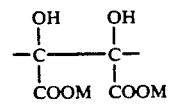
(VII)

and/or units of the formula VIII:

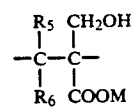
(VIII)

and/or units of the formula IX:

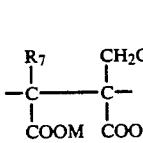
(IX)

wherein each of the R groups, which may be the same or different, represents a hydrogen atom, a methyl group or an ethyl group, and M represents a hydrogen atom or a solubilising cation.

2. A polymer as claimed in claim 1, wherein each of the R groups represents a hydrogen atom.

3. A polymer as claimed in claim 1, further comprising units of any one or more of the formulae IV and X to XI:

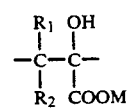
(IV)

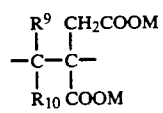
(X)

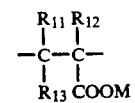
(XI)

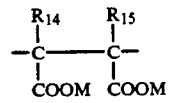
(XII)

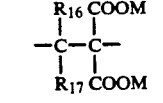
(XIII)

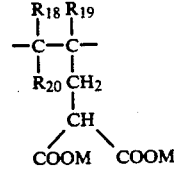
(XIV)

-continued

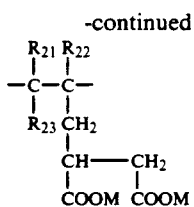

wherein each of the R groups, which may be the same or different, represents a hydrogen atom, a methyl group or an ethyl group, and M represents a hydrogen atom or a solubilising cation.

4. A polymer as claimed in claim 3, wherein each of the R groups represents a hydrogen atom.

5. A polymer as claimed in claim 1, comprising units of the formula VIII derived from 2-(hydroxymethyl) acrylic acid, or a salt thereof.

6. A polymer as claimed in claim 5 which is poly(2-hydroxymethylacrylic) acid or a salt thereof.

7. A polymer as claimed in claim 5, comprising units of the formula VIII and units of the formula XI, which is a copolymer of 2-hydroxymethylacrylic acid and acrylic acid, or a salt thereof.

8. A polymer as claimed in claim 5, comprising units of the formula VIII and units of the formula X, which is a copolymer of 2-hydroxymethylacrylic acid and itaconic acid, or a salt thereof.

9. A polymer as claimed in claim 5, comprising units of the formula VIII and units of the formula IV, which is a copolymer of 2-hydroxymethylacrylic acid and 2-hydroxyacrylic acid, or a salt thereof.

10. A polymer as claimed in claim 1, having a number-average molecular weight within the range of from 3000 to 40,000.

11. A polymer as claimed in claim 1, having a weight-average molecular weight within the range of from 5000 to 800,000.

12. A polymer as claimed in claim 1, in sodium salt form.

* * * * *